(12) United States Patent
Weintraub et al.

(10) Patent No.: US 9,497,167 B2
(45) Date of Patent: Nov. 15, 2016

(54) SYSTEM AND METHOD FOR AUTOMATIC PROVISIONING OF MULTI-STAGE RULE-BASED TRAFFIC FILTERING

(71) Applicant: Verint Systems Ltd., Herzelia, Pituach (IL)

(72) Inventors: Dana Weintraub, Tel Aviv (IL); Naomi Frid, Modi'in (IL)

(73) Assignee: VERINT SYSTEMS LTD., Herzilya Pituach (IL)

( * ) Notice: Subject to any disclaimer, the term of this patent is extended or adjusted under 35 U.S.C. 154(b) by 132 days.

(21) Appl. No.: 13/953,141

(22) Filed: Jul. 29, 2013

(65) Prior Publication Data

US 2014/0096228 A1     Apr. 3, 2014

(51) Int. Cl.
   *G06F 9/00* (2006.01)
   *G06F 15/16* (2006.01)
   *G06F 17/00* (2006.01)
   *H04L 29/06* (2006.01)

(52) U.S. Cl.
   CPC ....... *H04L 63/0263* (2013.01); *H04L 63/0236* (2013.01); *H04L 63/0245* (2013.01)

(58) Field of Classification Search
   CPC ............. H04L 63/0263; H04L 63/0245; H04L 63/0236
   USPC .......................................................... 726/13
   See application file for complete search history.

(56) References Cited

U.S. PATENT DOCUMENTS 5,606,668 A * 2/1997 Shwed ................... H04L 29/06
                                                         380/42
5,689,442 A   11/1997 Swanson et al.
6,330,610 B1 * 12/2001 Docter .............. G06F 17/30699
                                                       707/E17.059
6,404,857 B1   6/2002 Blair et al.
6,718,023 B1   4/2004 Zolotov (Continued)

OTHER PUBLICATIONS

Liu, Rong-Tai, et al., "A Fast Pattern-Match Engine for Network Processor-based NIDS," Proceedings of the 20th International Conference on Information Technology (ITCC'04), Dec. 5, 2006, 23 pages.

(Continued)

*Primary Examiner* — Dant Shaifer Harriman
(74) *Attorney, Agent, or Firm* — Meunier Carlin & Curfman

(57) ABSTRACT

Methods and systems for filtering communication packets using a multi-stage filtering system that receives a large volume of communication packets from a communication network that filters the packets in two or more successive stages. The system comprises at least one front-end filtering unit and multiple back-end filtering units. Typically although not necessarily, the front-end filtering unit filters the packets based on layer-2 to layer-4 attributes of the packets. The back-end filtering units, on the other hand, filter the packets based on content extracted from the packet payloads. The back-end filtering units may perform filtering, for example, based on keyword spotting, application classification, malware detection and other content-related criteria. The front-end filtering unit typically performs filtering at the individual packet level and/or at the level of request-response transactions. The back-end filtering units, on the other hand, typically perform filtering at the level of entire reconstructed packet flows.

10 Claims, 2 Drawing Sheets

(56) References Cited

U.S. PATENT DOCUMENTS

| | | | |
|---|---|---|---|
| 6,757,361 B2 | 6/2004 | Blair et al. | |
| 7,216,162 B2 | 5/2007 | Amit et al. | |
| 7,466,816 B2 | 12/2008 | Blair | |
| 7,587,041 B2 | 9/2009 | Blair | |
| 2004/0042470 A1* | 3/2004 | Cooper | H04L 12/2602 370/401 |
| 2008/0014873 A1 | 1/2008 | Krayer et al. | |
| 2008/0261192 A1 | 10/2008 | Huang et al. | |
| 2008/0285464 A1 | 11/2008 | Katzir | |
| 2015/0312220 A1* | 10/2015 | Crawford | H04L 63/0236 726/12 |

OTHER PUBLICATIONS

Rohde & Schwarz GmbH & Co. KG, "ACCESSNET-T, DMX-500 R2, Digital Mobile eXchange," Product Brochure, Secure Communications, Mar. 2000, 4 pages.

Rohde & Schwarz GmbH & Co. KG, "ACCESSNET-T IP," Product Brochure, Secure Communications, Jan. 2000, 4 pages.

Rohde & Schwarz GmbH & Co. KG, "R&S AllAudio Integrierte digitale Audio-Software," Product Brochure, Feb. 2002, 12 pages.

Rohde & Schwarz GmbH & Co. KG, "R&S AllAudio Integrated Digital Audio Software," Product Brochure, Radiomonitoring & Radiolocation, Feb. 2000, 12 pages.

Rohde & Schwarz GmbH & Co. KG, "The R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.

Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.

Rohde & Schwarz GmbH & Co. KG, "R&S RAMON COMINT/CESM Software," Product Brochure, Radiomonitoring & Radiolocation, Jan. 2000, 22 pages.

Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.

Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.

Rohde & Schwarz GmbH & Co. KG, "R&S RA-CM Continuous Monitoring Software," Product Brochure, Radiomonitoring & Radiolocation, Jan. 2001, 16 pages.

Rohde & Schwarz GmbH & Co. KG, "Integrated Digital Audio Software R&S AllAudio," Specifications, 8 pages.

Metronome SSL Inspector Solution Overview White Paper, "Examining SSL-encrypted Communications," 2010, 8 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Fisk, Mike, et al., "Applying Fast String Matching to Intrusion Detection," Los Alamos National Laboratory and University of California San Diego, 22 pages.

Fox Replay BV, "FoxReplay Analyst," http//www.foxreplay.com, Revision 1.0, Nov. 2007, 5 pages.

Fox-IT BV, "FoxReplay Analyst," Product Brochure, http//www.foxreplay.com, 2 pages.

Aho, Alfred V., et al., "Efficient String Matching: An Aid to Bibliographic Search," Communication of the ACM, Jun. 1975, vol. 18, No. 6, pp. 333-340.

Coffman, T., et al., "Graph-Based Technologies for Intelligence Analysis," CACM, Mar. 2004, 12 pages.

Cloudshield, Inc., "Lawful Intercept Next-Generation Platform," 2009, 6 pages.

Goldfarb, Eithan, "Mass Link Analysis: Conceptual Analysis," 2006, Version 1.1, 21 pages.

Verint Systems Inc., "Mass Link Analysis: Solution Description," Dec. 2008, 16 pages.

High-Performance LI with Deep Packet Inspection on Commodity Hardware, ISS World, Singapore, Jun. 9-11, 2008, Presenter: Klaus Mochalski, CEO, ipoque, 25 pages.

Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.

Schulzrinne, H., et al., "RTP: A Transport Protocol for Real-Time Applications," Standards Track, Jul. 2003, 89 pages.

Sheng, Lei, "A Graph Query Language and Its Query Processing," IEEE, Apr. 1999, pp. 572-581.

Soghoian, Christopher, et al., "Certified Lies: Detecting and Defeating Government Interception Attacks Against SSL," 2010, 19 pages.

Svenson, Pontus, "Social network analysis and information fusion for anti-terrorism," CIMI, 2006, 8 pages.

Tongaonkar, Alok S., "Fast Pattern-Matching Techniquest for Packet Filtering," Stony Brook University, May 2004, 44 pages.

Yu, Fang, et al., "Fast and Memory-Efficient Regular Expression Matching for Deep Packet Inspection," ANCS'06, Dec. 3-5, 2006, San Jose, California, 10 pages.

Yu, Fang, et al., "Gigabit Rate Packet Pattern-Matching Using TCAM," Proceedings of the 12th IEEE International Conference on Network Protocols (ICNP'04), 2004, 10 pages.

* cited by examiner

SYSTEM AND METHOD FOR AUTOMATIC PROVISIONING OF MULTI-STAGE RULE-BASED TRAFFIC FILTERING

FIELD OF THE DISCLOSURE

The present disclosure relates generally to communication analysis, and particularly to methods and systems for filtering communication traffic.

BACKGROUND OF THE DISCLOSURE

Communication packet inspection techniques are used in a wide variety of applications. For example, in some applications, communication packets are analyzed in an attempt to detect communication traffic of interest. Some data security systems inspect packets in order to detect information that leaks from an organization network. Some firewalls and intrusion detection systems inspect packets in order to identify illegitimate intrusion attempts or malicious traffic. Packet inspection systems are produced, for example, by Cloudshield Technologies (Sunnyvale, Calif.) and Ipoque (Leipzig, Germany).

SUMMARY OF THE DISCLOSURE

An embodiment that is described herein provides a method including receiving one or more filtering rules, for filtering communication packets by a multi-stage filtering system. The system includes multiple filtering units, including at least a front-end filtering unit and one or more back-end filtering units. The filtering rules are automatically translated into a set of filtering directives, such that each filtering directive specifies a filtering operation to be performed by a respective one of the filtering units and further specifies delivery of results of the filtering operation among the filtering units. The multi-stage filtering system is configured to filter the communication packets in accordance with the filtering rules, by configuring the filtering units with the filtering directives.

In some embodiments, translating the filtering rules includes specifying, in a given filtering directive, which of the filtering units are to receive the results of the given filtering directive. In an embodiment, translating the filtering rules includes instructing a given filtering unit to mark the results of a given filtering directive with respective identifiers of one or more filtering rules from which the given filtering directive was derived. In a disclosed embodiment, translating the filtering rules includes producing a filtering directive that is derived from two or more filtering rules and instructs the given filtering unit to perform the filtering operation only once for the two or more filtering rules and to mark the results of the single filtering directive with the identifiers of the two or more filtering rules.

In another embodiment, translating the filtering rules includes producing a filtering directive that instructs one of the back-end filtering units to identify one or more subsequent packet flows that relate to a given filtering rule, to mark the identified subsequent packet flows with an identifier of the given filtering rule, and to notify the front-end filtering unit with the identified subsequent packet flows.

In yet another embodiment, translating the filtering rules includes converting a given filtering rule into at least a first filtering directive that instructs the front-end filtering unit to perform a first filtering operation defined over layer-2 to layer-4 packet attributes, and a second filtering directive that instructs one of the back-end filtering units to perform a second filtering operation defined over content of payloads of the communication packets.

In still another embodiment, translating the filtering rules includes converting a given filtering rule into at least a first filtering directive that instructs the front-end filtering unit to perform a first filtering operation defined over individual communication packets or individual packet transactions, and a second filtering directive that instructs one of the back-end filtering units to perform a second filtering operation defined over flows to which the communication packets belong.

In some embodiments, translating the filtering rules includes converting a given filtering rule into at least a filtering directive that instructs a given filtering unit to output the results of the respective filtering operation to a user. In an embodiment, translating the filtering rules into the filtering directives includes generating a filtering directive that serves two or more of the filtering rules. In another embodiment, translating the filtering rules includes specifying in a given filtering directive one or more of the filtering rules from which the given filtering directive is derived.

There is additionally provided, in accordance with an embodiment that is described herein, apparatus including an interface and a processor. The interface is configured to receive one or more filtering rules for filtering communication packets by a multi-stage filtering system that includes multiple filtering units, including at least a front-end filtering unit and one or more back-end filtering units. The processor is configured to automatically translate the filtering rules into a set of filtering directives, such that each filtering directive specifies a filtering operation to be performed by a respective one of the filtering units and further specifies delivery of results of the filtering operation among the filtering units, and to configure the multi-stage filtering system to filter the communication packets in accordance with the filtering rules, by configuring the filtering units with the filtering directives.

There is also provided, in accordance with an embodiment that is described herein, a system including multiple filtering units and a provisioning unit. The multiple filtering units include at least a front-end filtering unit and one or more back-end filtering units, which are configured to filter communication packets. The provisioning unit is configured to receive one or more filtering rules for filtering the communication packets by the multiple filtering units, to automatically translate the filtering rules into a set of filtering directives, such that each filtering directive specifies a filtering operation to be performed by a respective one of the filtering units and further specifies delivery of results of the filtering operation among the filtering units, and to configure the system to filter the communication packets in accordance with the filtering rules, by configuring the filtering units with the filtering directives. In some embodiments, the front-end filtering unit is hardware-implemented in a network processor, and the back-end filtering units are software-implemented in one or more Central Processing Units (CPUs).

There is further provided, in accordance with an embodiment that is described herein, a computer software product, the product including a computer-readable medium, in which program instructions are stored, which instructions, when read by a computer, cause the computer to receive one or more filtering rules for filtering communication packets by a multi-stage filtering system that includes multiple filtering units, including at least a front-end filtering unit and one or more back-end filtering units, to automatically translate the filtering rules into a set of filtering directives, such that each filtering directive specifies a filtering operation to be performed by a respective one of the filtering units and further specifies delivery of results of the filtering operation among the filtering units, and to configure the multi-stage filtering system to filter the communication packets in accordance with the filtering rules, by configuring the filtering units with the filtering directives.

The present disclosure will be more fully understood from the following detailed description of the embodiments thereof, taken together with the drawings in which:

DETAILED DESCRIPTION OF EMBODIMENTS

Overview

Figure 1:
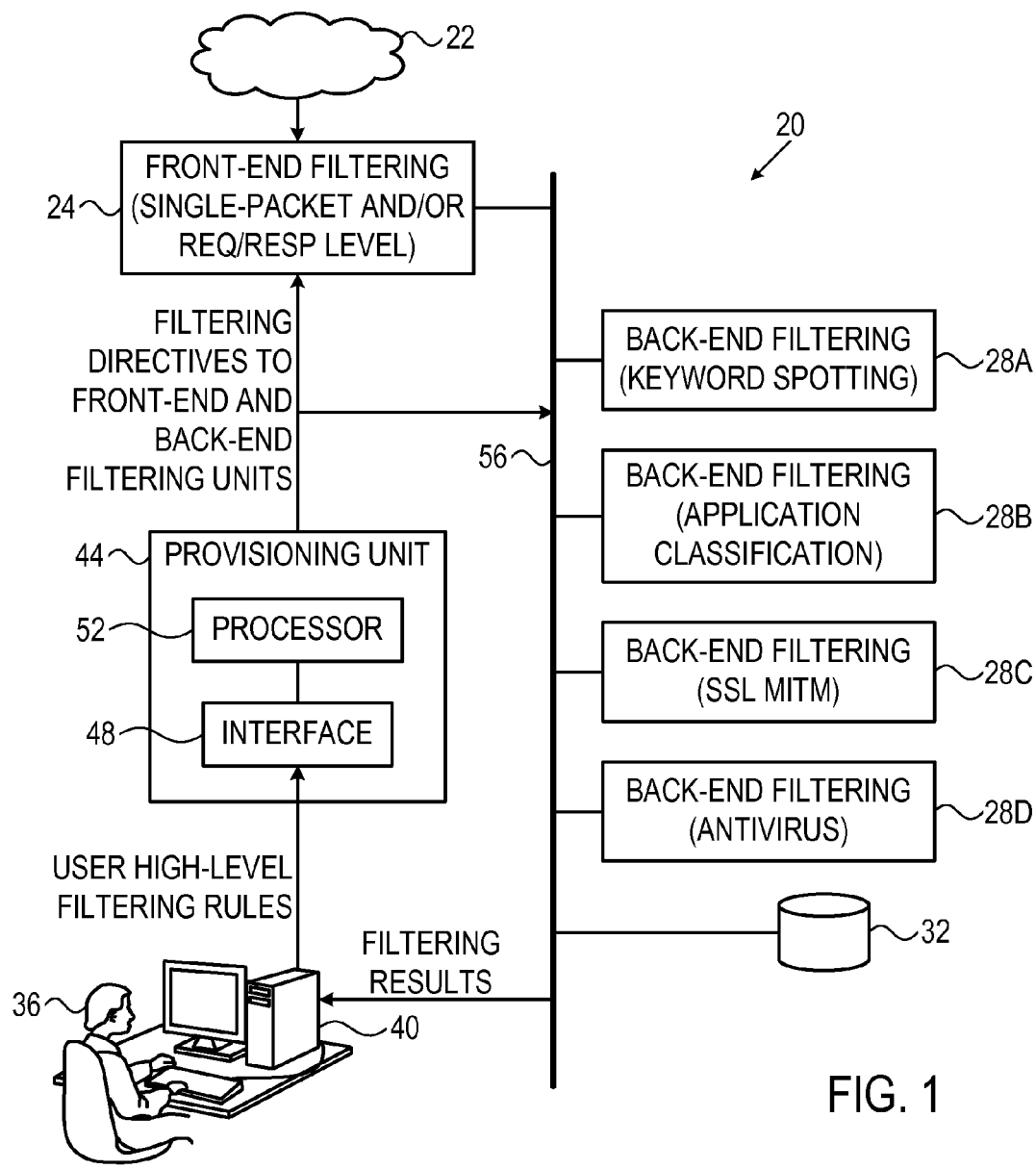
FIG. 1 is a block diagram that schematically illustrates a multi-stage traffic filtering system, in accordance with an embodiment that is described herein.

Various types of systems apply filtering to network communication traffic before analyzing or further processing the filtered traffic. For example, Intrusion Detection Systems (IDSs) and firewalls filter communication packets in order to identify and mitigate illegitimate intrusion attempts and malicious software. Some intelligence systems filter communication packets in order to focus on traffic of interest. Data Leakage Prevention (DLP) systems filter packets in order to identify information that illegitimately leaks out of an organization network.

Embodiments that are described herein provide improved methods and systems for filtering communication packets. In the present context, the term "filtering packets" means retaining a subset of the packets that are selected in accordance with some criterion, and discarding the other packets.

In the embodiments described herein, a multi-stage filtering system receives a large volume of communication packets from a communication network, and filters the packets in two or more successive stages. The system comprises at least one front-end filtering unit and multiple back-end filtering units. Typically although not necessarily, the front-end filtering unit filters the packets based on layer-2 to layer-4 attributes of the packets. The back-end filtering units, on the other hand, filter the packets based on content extracted from the packet payloads. The back-end filtering units may perform filtering, for example, based on keyword spotting, application classification, malware detection and other content-related criteria.

The front-end filtering unit typically performs filtering at the individual packet level and/or at the level of request-response transactions. The back-end filtering units, on the other hand, typically perform filtering at the level of entire reconstructed packet flows.

In some embodiments, the multi-stage filtering system filters the packets in accordance with filtering rules formulated by a user. The user may formulate high-level filtering rules that are defined over various packet features, such as packet header fields and packet content. Each rule is typically represented as a Boolean function of such packet features. For example, the user may formulate a filtering rule that retains all the traffic originating from a certain range of IP addresses (extracted from packet header fields), addressed to a certain e-mail address and containing a certain keyword (extracted from the packet payload content).

In the disclosed embodiments, the system comprises a provisioning unit (PRU) that automatically translates the high-level filtering rules into filtering directives for the various filtering units. The PRU then configures each filtering unit with the appropriate filtering directives. When the filtering units execute the filtering directives specified by the PRU, the system filters the communication packets in accordance with the high-level filtering rules.

In the above example, the PRU would translate the high-level filtering rule into three filtering directives: A directive for the front-end filtering unit to filter the packets originating from the specified IP address range, a directive to a keyword-spotting back-end filtering unit to filter the packets containing the specified keyword, and a directive to another back-end filtering unit to filter the packets addressed to the specified e-mail address.

In addition to specifying the desired filtering operation (i.e., which packets to retain and which to discard), the PRU specifies in each directive the mode of delivery of the filtering results. For example, each directive may specify one or more filtering units that are to receive the filtering results as input for subsequent processing. Using this mechanism, the PRU is able to translate each filtering rule into an optimal sequence of filtering operations to be performed by the various filtering units.

In some embodiments, each filtering directive indicates the high-level rule or rules from which it was derived. In many practical scenarios, multiple high-level rules may have a certain filtering operation in common (e.g., they may specify the same IP address range). The PRU may identify this commonality, and define a single filtering directive that performs the common filtering operation for the multiple rules. This mechanism enables the PRU to reduce the number of computations by exploiting commonalities between different filtering rules.

The system configuration described herein, and the automatic translation of high-level filtering rules into filtering directives, provide a powerful, user-friendly, flexible and efficient means for filtering large volumes of communication packets.

System Description

FIG. 1 is a block diagram that schematically illustrates a multi-stage traffic filtering system 20, in accordance with an embodiment that is described herein. System 20 receives communication packets from a communication network 22 and filters the packets in accordance with a set of high-level filtering rules, using methods that are described in detail below.

Systems such as system 20 may be used for various applications, such as for identifying and mitigating intrusion attempts into a communication network, identifying and preventing data leakage from a network, detecting malicious software, or monitoring communication traffic of target users of interest. All of these applications, and many others, involve processing and filtering a large volume of packets in accordance with certain filtering criteria. Network 22 may comprise any suitable network, typically an Internet Protocol (IP) network, such as the Internet or an enterprise Intranet.

System 20 comprises at least one front-end filtering unit 24, and multiple back-end filtering units 28. In the present example, system 20 comprises four back-end filtering units 28A . . . 28B, whose functions are addressed in detail below. System 20 performs a highly-efficient multi-stage filtering process by proper configuration of the various filtering units.

Additional aspects of such filtering architectures are addressed in Israel Patent Application 210900, entitled "System and method for efficient classification and processing of network traffic," filed Jan. 27, 2011, which is assigned to the assignee of the present patent application and whose disclosure is incorporated herein by reference.

Typically, front-end filtering unit 24 receives packets from network 22 and applies initial filtering to the received packets. Typically although not necessarily, front-end filtering unit 24 filters the packets based on layer-2 to layer-4 attributes of the packets, for example based on packet header fields. Such packet attributes may comprise, for example, source and/or destination IP addresses, ports or other suitable attributes. In some embodiments, however, front-end filtering unit 24 filters the packets based on higher-layer attributes such as Uniform Resource Locators (URLs).

In some embodiments, front-end filtering unit 24 filters packets at the individual packet level, or at the level of request-response transactions (e.g., HTTP request and response). In other embodiments, front-end filtering unit 24 considers the first few packets (e.g., 1-3 packets) at the beginning of a flow, for example when the URL is spread across two packets. Thus, the front-end filtering unit may typically consider only a small number of packets per flow, or even a single packet. Back-end filtering units 28A . . . 28D, on the other hand, typically consider a larger number of packets per flow, often the entire flow.

In contrast to the front-end filtering unit, back-end filtering units 28A . . . 28D typically filter the packets based on content that is extracted from the packet payloads. In the present example, unit 28A filters packets based on keyword spotting, i.e., retains the packets whose payload contains one or more specified keywords or phrases. Unit 28B filters packets based on application classification, i.e., retains the packets that carry traffic of a specified application type, such as Web-mail or a certain social network.

As another example, unit 28C filters packets whose data is encrypted using an encryption protocol, such as Secure Socket Layer (SSL) or Transport Layer Security (TLS). For these packets, unit 28C typically decrypts the encryption protocol using Man-In-The-Middle (MITM) techniques. Techniques of this sort are described, for example, in U.S. patent application Ser. No. 13/446,338, entitled "System and method for selective inspection of encrypted traffic," filed Apr. 13, 2012, which is assigned to the assignee of the present patent application and whose disclosure is incorporated herein by reference.

As yet another example, unit 28D filters packets based on antivirus criteria, i.e., identifies the packets containing malicious software (and retains or discards them depending on the application). Further alternatively, system 20 may comprise any other suitable type of back-end filtering unit, such as filtering units that perform decompression of compressed content, filtering units that perform intrusion detection, and or any other suitable function.

Typically, the back-end filtering units perform filtering at the level of entire reconstructed packet flows. Filtering by the back-end filtering units may involve decompression of the packet content or other decoding functions, as well as reconstruction of packet flows. By properly configuring the various filtering units, and defining the flow of data between them, system 20 may perform a wide variety of complex filtering operations that are defined over various types of packet features.

In an example scenario, a high-level filtering rule may contain the NOT operator. Such a rule, for example, may instruct system 20 to filter e-mails containing the word 'John' AND NOT 'Smith'. In another example rule, an intrusion detection system may attempt to identify malformed XML or HTML files. In a legitimate XML file, each XML part usually begins with '<Tag>' and ends with '</Tag>', as in the example below:

```
<author>
  <firstname>John</firstname>
  <surname>Smith</surname>
</author>
```

An intrusion detection system may therefore search for XMLs that do not contain the ending tags. A high-level filtering rule of this sort may request the system to filter XMLs that contain '<Tag>' AND NOT '</Tag>'. The above examples typically involve searching over the entire flow, and are therefore typically performed by the back-end filtering units.

In some embodiments, system 20 comprises a database 32, which is used for storing filtering rules, filtering directives, raw data such as incoming packets, interim filtering results of various filtering units, final filtering results, and/or any other suitable information. The filtering results are typically presented to an operator 36 (also referred to as a user) using a suitable output device (e.g., display) in an operator station 40. The operator station is also used by the operator to specify filtering rules to be applied by system 20, using a suitable input device.

In the disclosed embodiments, system 20 filters the packets in accordance with filtering rules formulated by operator 36. The filtering rules are typically formulated at high-level, e.g., as Boolean functions of various packet features. System 20 comprises a provisioning unit (PRU) 44, which automatically translates the high-level filtering rules into filtering directives for the front-end and back-end filtering units. The PRU then configures the filtering units with the appropriate filtering directives.

The functionality of PRU 44 is addressed in detail further below. In the present example, PRU 44 comprises an interface 48 for receiving the high-level filtering rules from operator station 40, and a processor 52 for carrying out the rule translation and configuration tasks described herein.

The various elements of system 20, e.g., front-end unit 24, back-end units 28A . . . 28D, database 32 and operator station 40, may communicate with one another over any suitable communication media 56, for example over a common bus or Local Area network (LAN).

The system configuration of system 20 shown in FIG. 1 is an example configuration, which is chosen purely for the sake of conceptual clarity. In alternative embodiments, any other suitable system configuration can also be used. The elements of system 20 may be implemented in hardware, in software, or using a combination of hardware and software elements. Database 32 may be implemented using any suitable storage device, such as solid state or magnetic disks.

In some embodiments, certain functions of system 20, such as the functions of processor 52 in PRU 44, may be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Automatic Filtering Unit Provisioning Based on High-Level Filtering Rules

In the disclosed embodiments, operator 36 specifies the filtering operations of system 20 by formulating a set of (one or more) high-level filtering rules. Operator station 40 and/or PRU 44 may comprise a suitable user interface for this purpose. The high-level filtering rules may be defined over any suitable feature of the packets, from any desired combination of network layer.

A high-level rule may specify, for example, a certain combination of layer-2 to layer-4 packet attributes (e.g., IP addresses) and application layer features such as the type of application and/or a keyword found in the packet payload. The operator typically specifies the high-level filtering rules as Boolean expressions of such packet features. The set of high-level filtering rules is provided via operator station 40 and interface 48 to processor 52 of PRU 44.

In some embodiments, processor 52 translates the set of high-level filtering rules into filtering directives for the various filtering units of system 20, in the present example front-end filtering unit 24 and back-end filtering units 28A . . . 28D. Processor 52 parses the Boolean expressions of the filtering rule so as to extract the desired packet features and corresponding filtering operations, decides which filtering unit is to perform each filtering operation, and produces the filtering directives accordingly.

Typically, in addition to specifying the filtering operation, each directive also specifies how the filtering results are to be delivered. For example, each filtering directive may specify a filtering operation, the filtering unit assigned to perform the filtering operation, and one or more of the filtering units that are to receive the filtering results for subsequent processing. This sort of definition enables processor 52 to specify various chains of filtering operations so as to optimally and efficiently carry out the set of high-level filtering rules. In an embodiment, for a given high-level filtering rule, the filtering directive for the last filtering unit in the chain specifies that the results are to be delivered to the user.

In some embodiments, each filtering directive specifies the high-level rule or rules from which it was derived. A given filtering directive may serve more than one high-level filtering rule. For example, in some scenarios multiple high-level filtering rules specify the same range of IP addresses, or the same set of keywords. In these scenarios, processor 52 may identify the commonality and produce a single filtering directive that serves the multiple high-level filtering rules. By proper definition of the results delivery, the filtering results of the common filtering directive can be processed by different filtering units, so as to carry out the multiple filtering rules.

Figure 2:
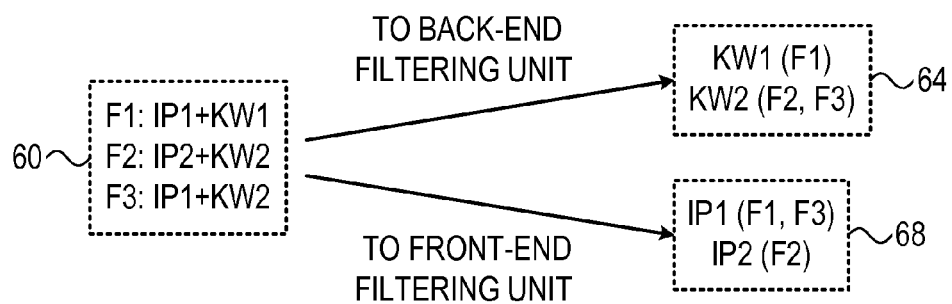
FIG. 2 is a diagram that schematically illustrates a process of translating high-level filtering rules into multi-stage filtering directives, in accordance with an embodiment that is described herein.

FIG. 2 is a diagram that schematically illustrates a process of translating high-level filtering rules into filtering directives, in accordance with an embodiment that is described herein. In the present example, operator 36 has specifies a set 60 of three high-level filtering rule denoted F1, F2 and F3.

Rule F1 instructs system 20 to retain the packets in an IP address range denoted IP1 that contain a keyword denoted KW1. Rule F2 instructs the system to retain the packets in an IP address range denoted IP2 that contain a keyword denoted KW2. Rule F3 instructs system 20 to retain the packets in IP address range IP1 (same range as in rule F1) that contain keyword KW2 (same keyword as in rule F3). Processor 52 of PRU 44 translates set 60 into a total of four filtering directives.

Two filtering directives 64 specify the filtering operations of back-end filtering unit 28A (which performs keyword spotting): The first filtering directive instructs unit 28A to filter the packets containing keyword KW1, and indicates that it was derived from high-level rule F1. The second filtering directive instructs unit 28A to filter the packets containing keyword KW2. This directive indicates that it was derived from high-level rules F2 and F3, which both specify the same keyword. Thus, the same filtering operation in unit 28A (keyword KW1) will be used as a building block for implementing both high-level rules.

Two filtering directives 68 specify the filtering operations of front-end filtering unit 24: The first filtering directive instructs unit 24 to filter the packets in IP address range IP1, and indicates that this directive was derived from high-level rules F1 and F3. The same filtering operation in unit 24 (IP address range IP1) will thus be used for implementing both high-level rules. The second filtering directive instructs unit 24 to filter the packets in IP address range IP2, and indicates that it was derived from high-level rule F2.

In some embodiments, execution of each high-level filtering rule begins with the filtering directive of front-end unit 24, and continues with subsequent filtering by back-end unit 28A. Thus, the filtering directives to unit 24 will typically specify delivery of the results to unit 28A, and the filtering directives to unit 24 will typically specify delivery of the results to the user.

Alternatively, however, processor 52 may implement other modes of delivery of the filtering results. For example, back-end filtering unit 28A may be instructed (via the filtering directives) to return the filtering results to front-end unit 24 for aggregation. Unit 24 in these embodiments collects the filtering results and presents them to operator 36. Further alternatively, aggregation and output of the final filtering results may be carried out by some external element outside of system 20.

In some embodiments, a high-level filtering rule may be executed by initial filtering and analysis by a back-end filtering unit, followed by steady-state filtering by front-end filtering unit 24 alone. Consider, for example, a high-level rule that specifies filtering of packets from a given IP address that are used by a given application type. If initial analysis by a back-end unit shows that the packets of a certain flow from the IP address in question conform to the desired application type, the front-end unit may be instructed to filter this flow. Subsequent filtering need not necessarily involve the back-end filtering unit.

In an example implementation, after a back-end filtering unit analyzes one or more flows, it may automatically create subsequent filters for the front-end unit. The front-end unit may subsequently apply these filters autonomously, without necessarily involving the back-end unit. For example, the back-end filtering unit may analyze Instant Messaging (IM) traffic, and identify an indication of subsequent flows that will be used for file transfer. In response, the back-end filtering unit may configure the front-end filtering unit to filter these file transfer traffic. In this example, the back-end unit analyzes layer-7 data and uses this analysis to configure a new layer-3 and/or layer-4 filter in the front-end unit.

More complex scenarios are also feasible: Consider an example where a high-level filtering rule instructs the system to filter only files that contain a specific word that is sent over an IM application. This high-level rule is translated by the PRU into a set of four filtering directives:

A directive that instructs the front-end unit to filter IM flows and to deliver the results to a back-end unit.

A directive instructing the back-end unit to analyze these IM flows and search for file transfer flows, and deliver the subsequent flows identifiers to the front-end unit.

A directive instructing the front-end unit to transfer flows that will match the subsequent flows identifiers to a keyword-spotting back-end filtering unit.

A directive instructing the keyword-spotting back-end filtering unit to reconstruct files from input flows and search for the specific keyword.

All four filtering directives are synchronized to contain the same high-level rule identifier.

The translation process shown in FIG. 2 is an example simple process, which is chosen for the sake of clarity. In alternative embodiments, processor 52 may translate any suitable set of high-level filtering rule of any size and complexity. Processor 52 may translate the rules into filtering directives addressed to any desired number of filtering units. The directives may specify any desired filtering operations, in any desired order, and any desired delivery mode for the filtering results.

Figure 3:
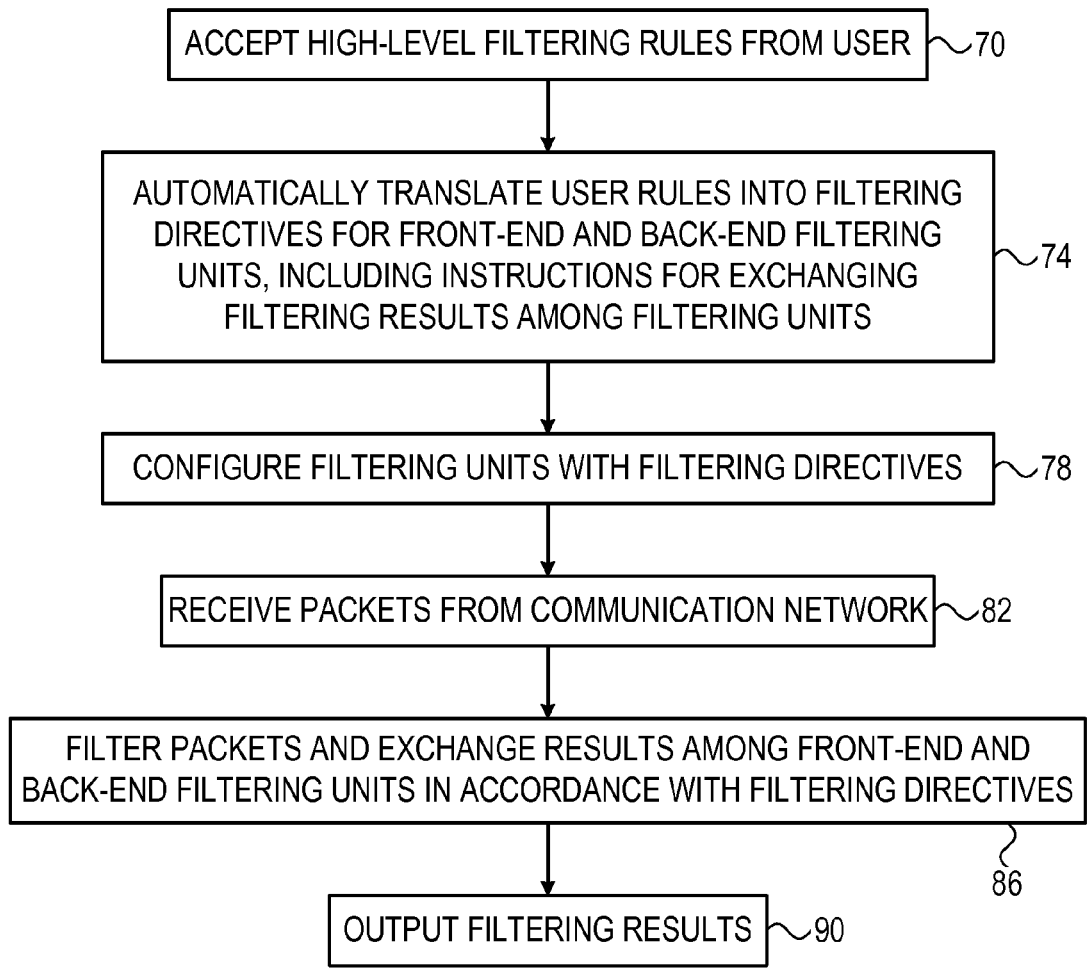
FIG. 3 is a flow chart that schematically illustrates a method for multi-stage traffic filtering, in accordance with an embodiment that is described herein.

FIG. 3 is a flow chart that schematically illustrates a method for multi-stage traffic filtering, in accordance with an embodiment that is described herein. The method begins with processor 52 of PRU 44 accepting a set of high-level filtering rules from operator station 40 via interface 48, at an input step 70. Processor 52 automatically translates the high-level filtering rules into filtering directives for the front-end and back-end filtering units, at a translation step 74. Processor 52 configures each filtering unit with the appropriate directives, at a configuration step 78.

System 20 (typically front-end filtering unit 24) receives communication packets for filtering from network 22, at a packet reception step 82. The various filtering units of system 20 filter the packets and exchange the filtering results with one another, in accordance with the filtering directives, at an execution step 86. System 20 outputs the filtering results to operator station 40 for presentation to operator 36, at an output step 90.

In some embodiments, the above-described translation and configuration process is performed off-line, before system 20 begins to filter packets. Additionally or alternatively, at least part of the translation and configuration process may be performed during operation of the system. For example, operator 36 may modify, add or delete high-level rules in real time. In response to such actions, processor 52 of PRU 44 may adapt one or more of the filtering directives and reconfigure one or more of the filtering units to match the updated high-level filtering rules.

It will be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:

receiving, by an interface, one or more filtering rules, for filtering communication packets by a multi-stage filtering system that includes multiple filtering units, including at least a front-end filtering unit that performs a first filtering operation on the communication packets based on layer-2 to layer-4 attributes of the communication packets at a request-response transaction level and one or more back-end filtering units that perform a second filtering operation on the communication packets that passed through the first filtering operation, the second filtering operation being based on content extracted from payloads of the filtered communication packets at a level of entire reconstructed packet flows;

automatically translating, by a processor, the filtering rules into a set of filtering directives, by at least converting a first filtering rule into both a first filtering directive and a second filtering directive, wherein the first filtering directive instructs the front-end filtering unit to perform the first filtering operation and to communicate the communication packets that passed through the first filtering operation to at least one of the back-end filtering units, wherein the second filtering directive instructs the at least one of the back-end filtering units to perform the second filtering operation on the communication packets that passed through the first filtering operation, and wherein translating the filtering rules further comprises instructing a given filtering unit to mark the communication packets that passed through a given filtering operation of a given filtering directive with respective identifiers of one or more filtering rules from which the given filtering directive was derived; and configuring, by the processor, the multi-stage filtering system to filter the communication packets in accordance with the filtering rules, by configuring the filtering units with the filtering directives.

2. The method according to claim 1, wherein translating the filtering rules further comprises producing a filtering directive that is derived from two or more filtering rules, which instructs the given filtering unit to both perform a given filtering operation only once for the two or more filtering rules and to mark the communication packets that passed through the single filtering operation with the identifiers of the two or more filtering rules.

3. The method according to claim 1, wherein translating the filtering rules further comprises producing a filtering directive that instructs one of the back-end filtering units to identify one or more subsequent packet flows that relate to a given filtering rule, to mark the identified subsequent packet flows with an identifier of the given filtering rule, and to notify the front-end filtering unit with the identified subsequent packet flows.

4. The method according to claim 1, wherein translating the filtering rules further comprises converting a given filtering rule into at least a filtering directive that instructs a given filtering unit to output results of the respective filtering operation to a user.

5. The method according to claim 1, wherein translating the filtering rules further comprises specifying in a given filtering directive one or more of the filtering rules from which the given filtering directive is derived.

6. Apparatus, comprising:

an interface, which is configured to receive one or more filtering rules for filtering communication packets by a multi-stage filtering system that includes multiple filtering units, including at least a front-end filtering unit that performs a first filtering operation on the communication packets based on layer-2 to layer-4 attributes of the communication packets at a request-response transaction level and one or more back-end filtering units that perform a second filtering operation on the communication packets that passed through the first filtering operation, the second filtering operation being based on content extracted from payloads of the filtered communication packets at a level of entire reconstructed packet flows; and a processor, which is configured to automatically translate the filtering rules into a set of filtering directives by at least converting a first filtering rule into both a first filtering directive and a second filtering directive, wherein the first filtering directive instructs the front-end filtering unit to perform the first filtering operation and to communicate to at least one of the back-end filtering units the communication packets that passed through the first filtering operation, and wherein the second filtering directive instructs at least one of the back-end filtering units to perform the second filtering operation on the communication packets that passed through the first filtering operation, and to configure the multi-stage filtering system to filter the communication packets in accordance with the filtering rules, by configuring the filtering units with the filtering directives; wherein the processor is further configured to instruct a given filtering unit to mark the communication packets that passed through a given filtering operation of a given filtering directive with respective identifiers of one or more filtering rules from which the given filtering directive was derived.

7. The apparatus according to claim 6, wherein the processor is further configured to produce a filtering directive that is derived from two or more filtering rules, which instructs the given filtering unit to both perform a given filtering operation only once for the two or more filtering rules and to mark the results of the single filtering operation with the identifiers of the two or more filtering rules.

8. The apparatus according to claim 6, wherein the processor is further configured to produce a filtering directive that instructs one of the back-end filtering units to identify one or more subsequent packet flows that relate to a given filtering rule, to mark the identified subsequent packet flows with an identifier of the given filtering rule, and to notify the front-end filtering unit with the identified subsequent packet flows.

9. The apparatus according to claim 6, wherein the processor is further configured to convert a given filtering rule into at least a filtering directive that instructs a given filtering unit to output results of the respective filtering operation to a user.

10. The apparatus according to claim 6, wherein the processor is further configured to specify in a given filtering directive one or more of the filtering rules from which the given filtering directive is derived.

* * * * *

UNITED STATES PATENT AND TRADEMARK OFFICE
CERTIFICATE OF CORRECTION

PATENT NO. : 9,497,167 B2  
APPLICATION NO. : 13/953141  
DATED : November 15, 2016  
INVENTOR(S) : Dana Weintraub et al.

Page 1 of 1

It is certified that error appears in the above-identified patent and that said Letters Patent is hereby corrected as shown below:

On the Title Page

Insert after the Prior Publication Data section

--Foreign Application Priority Data  
July 29, 2012 (IL) ...................... 221175--

Signed and Sealed this  
Eighth Day of August, 2017

Joseph Matal  
*Performing the Functions and Duties of the*  
*Under Secretary of Commerce for Intellectual Property and*  
*Director of the United States Patent and Trademark Office*